ically fire wall or partition 12, only a fragment of which

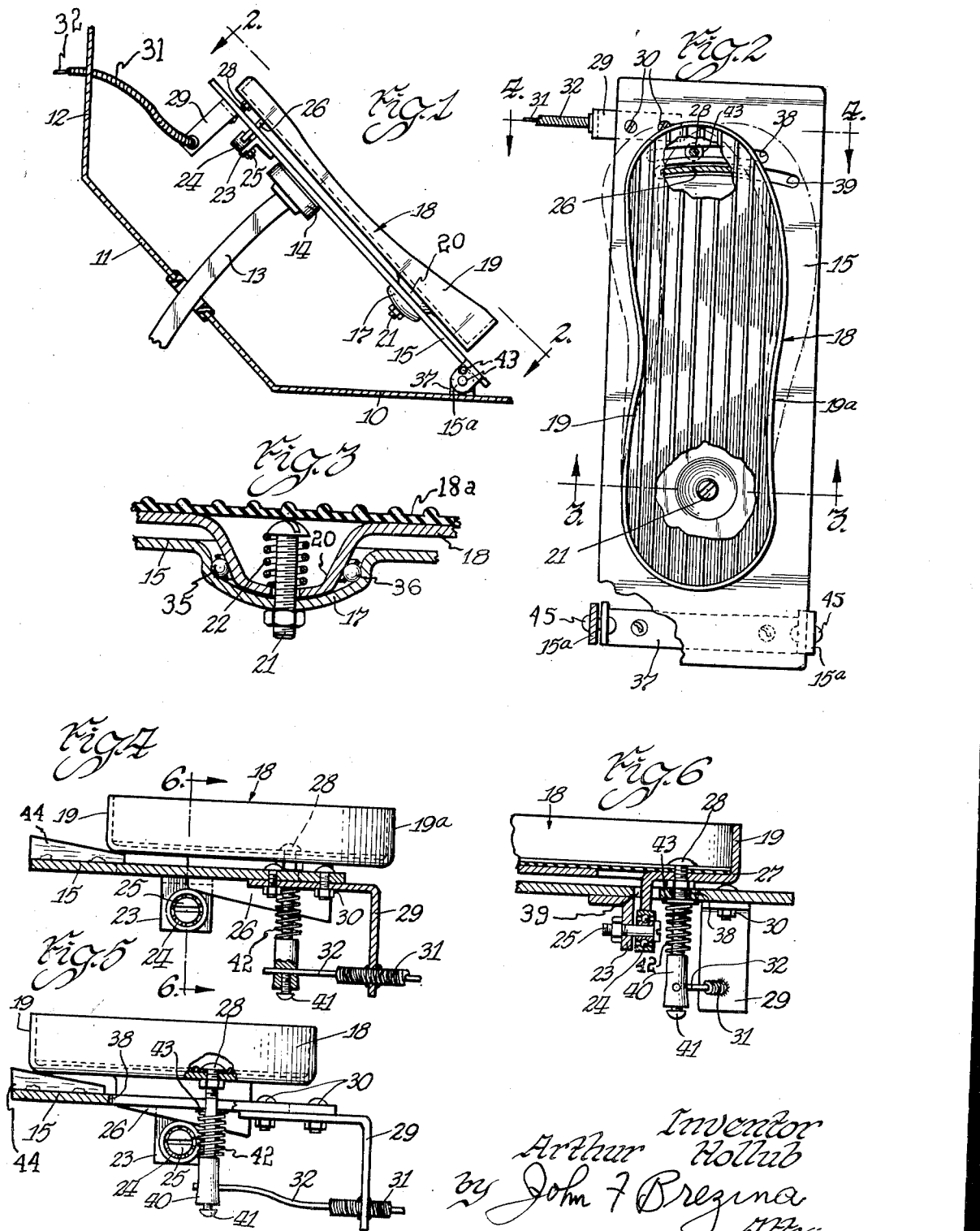

United States Patent Office 2,707,036
Patented Apr. 26, 1955

2,707,036

SAFETY GAS FEEDING AND BRAKE CONTROL MECHANISM

Arthur Hollub, Chicago, Ill.

Application August 20, 1952, Serial No. 305,421

8 Claims. (Cl. 192—3)

My invention is directed to a novel mechanism for selectively and adjustably controlling the gas feed throttle of carburetors of vehicle engines, and which includes means whereby a single foot-actuated member will control the brake pedal of standard vehicles and the gas throttle.

It is an important object of my invention to provide a mechanism embodying a single foot pedal which is pivotly mounted for both forward and backward movement as well as for selective transverse movement, and which is operatively associated with the depressable brake pedal or lever and also with the gas feeding throttle, whereby selective sidewise or transverse movement of the pedal will adjust and selectively position the gas feeding means.

Accidents have occurred due to riders erroneously depressing the gas pedal and causing the vehicle to collide with another object, especially when the drivers suddenly press forward with their foot with intention of depressing the brake pedal. The stress of expected collision, or when other cars either stop suddenly or move into the path of driver, has caused a certain amount of confusion and tension, resulting in the depression of the standard gas pedal in place of depression of the brake pedal. My invention eliminates the danger of throttle opening or gas mechanism operation when forward or downward pressure is applied to a unitary pedal on which the driver will constantly position his right foot and will automatically apply brake without the necessity of removal thereof during normal driving.

A further object of my invention is the provision of a manually operable mechanism, including a single pedal movably mounted for both backward and forward movement and for sidewise movement, and which has means operatively connecting the same to throttles whereby sidewise movement in one direction will open the throttles to the desired degree, and which includes cam means adapted to cause said pedal to be moved to throttle-closing position when such pedal is pressed in a forward and downward direction by the operator, the operator's right foot being always in brake-operating position when feeding gas fuel to the engine.

Other and further objects of my invention will be apparent from the following description and appended claims.

On the drawings:

Fig. 1 is a side elevation of my manually operable control device and showing portions of the floor and portion of the walls in cross section.

Fig. 2 is a top plan view illustrating in dotted lines additional positions to which said foot pedal may be manually moved.

Fig. 3 is an enlarged cross sectional view of a fragment of the connection bearing means with parts broken away and taken on line 3—3 of Fig. 2.

Fig. 4 is an enlarged cross sectional view taken on the plane indicated by line 4—4 of Fig. 2.

Fig. 5 is an enlarged view looking at the upper end of my device and showing certain parts broken away.

Fig. 6 is an enlarged cross sectional view on a longitudinal central plane and with parts broken away and showing the details of the co-acting cam and roll means and associated parts.

Referring to the drawings:

Numeral 10 designates a portion of the floor of the vehicle which has the usual apertured integral inclined extension or foot board 11, which is connected to the vertical fire wall or partition 12, only a fragment of which is shown in Fig. 1. Numeral 13 designates the brake lever, a fragment of which is shown, which has the usual foot pedal 14 thereon.

Numeral 15 designates an elongated plate having angularly bent integral ears 15a which are pivoted or hinged by connected cross pins or bolts at its upwardly bent apertured ends of a U-shaped apertured bracket 37 which is secured by screws to the floor section 10 as shown in Figs. 1 and 2. Said plate 15 has an apertured depressed boss 17 formed therein a short distance from its lower end, as illustrated in Figs. 1 and 3, and has annular recess 35 in which a ball bearing 36 is seated, so that the bearings roll in the track defined by said recess.

A foot pedal 18 preferably of metal sheet has lateral side flanges 19 and 19a carries a depressed integral boss 20, which is apertured or slotted and is struck out from its lower portion, as shown in Figs. 1 and 3, and which is of smaller dimension than boss 17. Said boss 20 seats and rocks or partially rotates in bearing 36. Pedal 18 may optionally have a sheet or pad of rubber or the like 18a thereon, as shown in Figs. 2 and 3. A bolt 21 with its mounted nut having a spacer spring 22 mounted between its head and the boss 19 yieldably mounts said pedal and bracket into movable engagement with bearing 36, said bosses being in superposed partially nesting positions and said mounting permitting said pedal to be mounted transversely and also in upward and downward directions.

Referring to Figs. 1, 4, 5 and 6, plate 15 carries an angular apertured bracket 23 on which is journalled a roller or ball bearing 24 by means of a mounting bolt 25.

A depending cam 26 is mounted or carried on the lower face of the pedal so that inclined end face faces downwardly and rollably engages the outer race of ball bearing 24. Cam 26 has an apertured angular integral extension 27 which is secured by bolt and nut 28 to an apertured portion of the pedal 18 so that said cam is disposed transversely of the longitudinal axis of said pedal. Plate 15 has a transverse slot 39 as illustrated in Fig. 2, and the depending portion of cam 26 extends through and is movable in said slot 39.

As shown in Figs. 1, 4, 5 and 6, an angular metal bracket 29 has one apertured leg thereof secured, for example, by bolts 30 to the base plate 15. Its outer leg has a passage in which is suitably secured the end portion of the flexible metal tube-like covering 31 in which a wire cable 32 is slidable. Only a fragment of said covering and of said cable are illustrated. Said cable 32 extends to and is connected to the fuel control valve of the carburetor or throttle (not shown) so that push or pull of said cable opens or partially closes the gas feeding valve. Covering 31 also extends to a point adjacent the gas feed valve.

The upper end portion of plate 15 has a second slot 38 a short distance above slot 39. The bolt 28 is mounted in an aperture or slot formed in the upper portion of pedal 18 and extends downwardly and through the slot 38. Said screw acts as an adjustable stop or limiting means for limiting the transverse movement of said pedal in either direction as the depending portion of said screw engages the ends of said slot 38.

Referring to Figs. 4, 5 and 6, bolt 28 is of a length so that it extends substantially below plate 15 as well as through the slot 38 thereof, and has a transversely passaged terminal cable anchoring fitting or member 40 threaded on the end thereof. Said terminal member 40 is internally threaded and has a screw 41 therein whose end impinges upon the wire cable 32 which is mounted in the transverse passage of member 40, so that said cable is thereby adjustably anchored to said member.

As illustrated in Figs. 4, 5 and 6, a metal expansion spring 42 is interposed between the inner end face of terminal member 40 and a washer 43 and about the lower end portion of screw 28 so that said washer 43 will be held under tension and in sliding engagement with the portion of the lower face of the plate 15 immediately adjacent the slot 38. As the said pedal is moved transversely, the washer 43 will slide with slight friction along the lower face of said plate and thereby assist the manual holding of the foot pedal in any position desired with respect to its transverse movement and so that undesirable vibration is avoided and the pedal temporarily stabilized in any of the desired positions thereof.

It will be understood that as said flexible cable 32 is connected to the gas or fuel throttle of the carburetor that transverse movement of pedal 18 in one direction to the operator's right will open said throttle and return movement will close or partially close said throttle.

In Fig. 4, the position of the foot pedal is illustrated as being in the extreme left hand position with respect to the vehicle operator and wherein the throttle cable 32 will be thrust or moved toward the carburetor throttle to hold the latter in the normal minimum engine idling position. In Fig. 5, the foot pedal 18 is illustrated as being moved approximately one-half the normal distance to the right so that cable 32 will cause the throttle to be partially opened.

Most standard throttles or throttle operating levers have a suitable spring connected thereto for returning the same to normal minimum engine idling position, such throttle and spring not being shown in the drawings hereof.

Such throttle spring exerts through normal pull to return the throttle lever to minimum gas feeding position to which it may be preset. Such movement to minimum position is transmitted equally through the slidable cable 32, terminal member 40 and screw 28 to move and return the foot pedal toward or to the maximum left hand position. If the operator desires to move the foot pedal to the extreme left position and consequently the throttle valve to minimum position, the operator may slightly twist or pivot his foot on the pedal to the left, thereby causing his shoe to engage the left side flange 19 to effect such movement. When the operator desires to feed additional gas to the vehicle engine, he will twist his foot slightly to the right to the desired degree so that the right edge of his shoe will engage the right hand flange 19 and thereby move pedal 18 to the right according to the amount of fuel desired to be fed and the engine speed desired and adjustably maintain such foot pedal in the desired position to selectively regulate the engine speed. Whenever the operator desires to apply the brakes, regardless of what gas feeding position of gas feeding pedal 18 may exist at the time, the operator will merely depress the pedal 18 in a forward and generally downwardly direction and without the need for any transverse or foot twisting movement upon which forward and downward pedal depression, the cam 26 will roll along the ball bearing 24 until the foot pedal has reached the extreme left hand position wherein the throttle will have been moved to minimum engine idling position.

The aforesaid operation and mechanism providing for the automatic and immediate return of the foot pedal to minimum fuel feeding position, insures that any quick forward and downward depressing movement of the pedal will immediately place the throttle into the minimum normal idling position of the engine, and thereupon applies the brake pedal without shifting or removing the right foot of the operator to any other pedal, all this without any other action by the operator who frequently finds it necessary to apply the brakes quickly to avoid accidents.

The said mechanism and the aforesaid operation thereof eliminates the frequent mistakes which occur by operators, often under stress, in accidentally and unintentionally depressing the normal gas accelerator instead of the brake pedal, or as in some cases, the depression of both the gas pedal and foot brake pedal simultaneously.

As listed in Fig. 1, the depending ears 15a are provided with two spaced apart holes 43, one thereof being above the other, so that the height and relative angle of the pivoted plate 15 may be selectively adjusted according to the desired position of the foot in relation to any particular brake pedal. This vertical and angular adjustment is accomplished by removal of the pins or bolts 45 and remounting of the same in the adjacent holes. It will be understood that the size of ears 15a may be varied and that the number of such vertical spaced holes 43 may be increased.

Referring to Figs. 4 and 5, the plate 15 carries at its upper end portion a cam-like rest or member 44, which may be formed from a piece of sheet metal and whose upper edge is bevelled or inclined inwardly and downwardly as illustrated. Said rest or support 44 may be secured by welding or the like to plate 15. As the upper edge of the pedal slides transversely during the portion of its movement in which it is past the intermediate position, such as illustrated in Fig. 5, the lower edge portion of said pedal will slidably engage the upper bevelled edge of support 44, so that the pedal will be maintained level during a part of its transverse movement, from transverse rocking or pivoting when the weight of the foot or manual pressure is applied thereto. Such bevelled rest 44 does not retard to any noticeable degree the herein described transverse movement of said pedal.

My novel device herein described provides an advantageous and effective means of preventing frequent serious accidents which in the past have often occurred because upon even slight collision or impact the driver is pushed or moved forward upon sudden stoppage of the car, which has caused such driver to push forward and downward on the accelerator to increase the speed of the car and materially aggravate the impact of the car with another vehicle or other object and with resulting greater damage. With my device the danger of unintentional increased speed under such conditions is eliminated due to the fact that any forward or downward foot pressure on the pedal, whether intentional or unintentional, will immediately apply the brake instead of depressing the accelerator.

My device has the further advantage in that it eliminates the frequent movements of the right foot to and from the accelerator (that is back and forth between accelerator and present brake pedals) which is tiresome and energy consuming, especially in city driving where frequent changes are necessary. Consequently, driving with use of my device is more restful than with present equipment.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. A device for use with a power driven vehicle having a foot-operated brake pedal and a fuel control mechanism comprising, a plate pivotally connected at one end to the vehicle floor adjacent the brake pedal and having its other end normally engaging the brake pedal, said plate having a slot formed therethrough adjacent the end engaging the brake pedal; an extension fixed to and depending from the underside of said plates adjacent one edge of said slot; a roller rotatably mounted on said extension; a foot-receiving member; means for swivelly connecting said member to said plate whereby said member is capable of pivoting relatively to said plate in a vertical direction and a transverse direction; a cam carried by said member extending through said slot, said cam having an inclined surface normally engaging said roller whereby transverse pivotal movement of said member relative to said plate in one direction causes said member to simultaneously pivot vertically away from said plate; and means for operatively connecting said member to said fuel control mechanism whereby said mechanism is actuated by relative pivotal movement of said member with respect to said plate.

2. A device substantially as set forth in claim 1, in which, said means for swivelly connecting said member to said plate includes a concave, semi-spherical depression formed in said plate, a convex, semi-spherical projection depending from said member adapted to abut the concave surface of said depression, a ball bearing assembly disposed between said depression and projection; and resilient means for yieldably urging said projection into engagement with said concave surface.

3. A device for use with an engine-powered vehicle having a foot-operated brake pedal and a fuel control mechanism comprising, a plate pivotally connected at one end to the vehicle floor adjacent the brake pedal and having its other end overlying and normally engaging the brake pedal; a foot receiving member having an end portion swivelly connected to said plate whereby said member is capable of pivotally moving vertically and transversely with respect to said plate; means for guiding said member along a predetermined transversely extending, vertically inclined path with respect to said plate; and means for operatively connecting said member to said fuel control mechanism whereby said mechanism is actuated by movement of said member with respect to said plate along said path.

4. The device substantially as set forth in claim 3, in which, said means for guiding said member includes a cam fixed to said member and extending through a slot formed in said plate, said cam having a transversely extending, vertically inclined edge adapted to engage a cam follower carried by said plate.

5. A device for use with an engine-powered vehicle having a foot-operated brake pedal and a fuel throttle means for the engine comprising, a plate having one end pivotally connected to the vehicle floor and its free end overlying and engaging the brake pedal; a foot-receiving member having an end portion swivelly connected to said plate whereby the free end of said member is capable of pivoting vertically and transversely with respect to said plate between a first position wherein the free end of said member is disposed substantially close to said plate and a second position transversely and vertically spaced above the first position; and means for operatively connecting said member to said fuel throttle means, said first position of said member representing the throttle closed position and said second position representing the throttle fully opened position.

6. The device substantially as set forth in claim 5, in which, cam means are provided for causing said member to move toward said first position upon the application of vertically downward pressure thereto, said cam means including a cam fixed to said member and extending through a slot formed in said plate, said cam having a transversely extending, vertically inclined edge adapted to engage a roller rotatably mounted on said plate.

7. The device substantially as set forth in claim 6, in which said cam means further includes a support fixed to the upwardly facing surface of said plate, said support being transversely spaced from said roller and having an inclined surface engageable by an edge portion of said member, said support inclined surface having a slope substantially equal to the slope of said cam whereby said member is prevented from canting with respect to said plate.

8. The device substantially as set forth in claim 7, in which, said means for operatively connecting said member to said fuel throttle means includes a depending bolt secured to the underside of said member and extending through a second slot formed in said plate and a Bowden wire having one end secured to said bolt and adapted to have its opposite end operatively connected to said fuel throttle means.

References Cited in the file of this patent

UNITED STATES PATENTS

| | | |
|---|---|---|
| 1,711,988 | Brochon | May 7, 1929 |
| 1,718,884 | Thorpe | June 25, 1929 |
| 2,181,883 | Gibson | Dec. 5, 1939 |

FOREIGN PATENTS

| | | |
|---|---|---|
| 239,662 | Great Britain | Sept. 17, 1925 |